United States Patent
Hanna

(10) Patent No.: US 12,056,866 B2
(45) Date of Patent: Aug. 6, 2024

(54) METHOD OF OPTICAL QUALITY INSPECTION OF WORKPIECES

(71) Applicant: Mectron Engineering Company, Inc., Saline, MI (US)

(72) Inventor: Andrew Hanna, Saline, MI (US)

(73) Assignee: MECTRON ENGINEERING COMPANY, INC., Saline, MI (US)

( * ) Notice: Subject to any disclaimer, the term of this patent is extended or adjusted under 35 U.S.C. 154(b) by 469 days.

(21) Appl. No.: 17/452,581

(22) Filed: Oct. 28, 2021

(65) Prior Publication Data

US 2023/0136456 A1    May 4, 2023

(51) Int. Cl.
G06T 7/00    (2017.01)
G06T 7/33    (2017.01)

(52) U.S. Cl.
CPC ............ *G06T 7/001* (2013.01); *G06T 7/33* (2017.01); *G06T 2207/20212* (2013.01); *G06T 2207/30164* (2013.01)

(58) Field of Classification Search
CPC . G06T 7/001; G06T 7/33; G06T 2207/20212; G06T 2207/30164;
(Continued)

(56) References Cited

U.S. PATENT DOCUMENTS 4,203,673 A    5/1980  Buckson
4,410,278 A   10/1983  Makihira et al.
(Continued)

FOREIGN PATENT DOCUMENTS

EP    2543082 B1 *  11/2016
GB    2057675 A      4/1981
(Continued)

OTHER PUBLICATIONS

International Search Report and Written Opinion of PCT/US2022/078754 mailed Jan. 19, 2023.

*Primary Examiner* — Samir A Ahmed
(74) *Attorney, Agent, or Firm* — DICKINSON WRIGHT PLLC

(57) ABSTRACT

A method for inspecting nominally identical workpieces with manufacturing tolerances involves feeding a workpiece to an inspection device; applying a simultaneous translatory and rotational movement to the workpiece via the inspection device while illuminating the workpiece; repeatedly taking camera images of the workpiece during the simultaneous translatory and rotational movement as the workpiece moves across a camera window, the camera images consisting of pixels; setting workpiece parameters based on size and shape of the workpiece; assembling a composite image from the camera images based on the workpiece parameters; determining numerical brightness scores of the workpiece, comparing the determined numerical brightness scores with known numerical brightness scores; assigning a discrepancy score; setting a discrepancy score threshold; determining that the workpiece passes inspection when the discrepancy score is below the discrepancy score threshold; and that the workpiece fails the inspection when the discrepancy score is above the discrepancy score threshold.

19 Claims, 3 Drawing Sheets

(58) Field of Classification Search
CPC . G06T 2207/10016; G06T 2207/30136; G06T 7/0006
See application file for complete search history.

(56) References Cited

U.S. PATENT DOCUMENTS

| | | | |
|---|---|---|---|
| 4,912,318 | A | 3/1990 | Kajiura et al. |
| 4,923,066 | A | 5/1990 | Ophir et al. |
| 5,114,230 | A | 5/1992 | Pryor |
| 5,136,157 | A | 8/1992 | Apter et al. |
| 5,499,718 | A | 3/1996 | Bhatia et al. |
| 6,973,209 | B2 | 12/2005 | Tanaka |
| 7,329,855 | B2 | 2/2008 | Katayama et al. |
| 7,633,634 | B2 | 12/2009 | Spalding et al. |
| 7,755,754 | B2 | 7/2010 | Spalding |
| 8,237,935 | B2 | 8/2012 | Nygaard et al. |
| 9,047,657 | B2 | 6/2015 | Nygaard |
| 9,519,844 | B1 * | 12/2016 | Thompson .............. G06F 18/24 |
| 2002/0009220 | A1 | 1/2002 | Tanaka |
| 2003/0127372 | A1 | 7/2003 | Kenneway |
| 2005/0275831 | A1 | 12/2005 | Silver |
| 2009/0103109 | A1 | 4/2009 | Spalding et al. |
| 2009/0279772 | A1 | 11/2009 | Sun et al. |
| 2009/0290781 | A1 | 11/2009 | Yannick et al. |
| 2010/0201806 | A1 | 8/2010 | Nygaard et al. |
| 2010/0238435 | A1 | 9/2010 | Spalding |
| 2013/0307962 | A1 | 11/2013 | Humphries et al. |
| 2014/0270425 | A1 | 9/2014 | Kenny et al. |
| 2015/0241457 | A1 | 8/2015 | Miller |
| 2015/0329221 | A1 * | 11/2015 | Georgeson ......... G01N 29/0654 702/36 |
| 2016/0290927 | A1 * | 10/2016 | Buczkowski .......... G01N 21/47 |
| 2017/0052070 | A1 * | 2/2017 | Marsh ...................... G06T 7/40 |
| 2017/0212066 | A1 * | 7/2017 | Thompson ........... G06V 10/764 |
| 2017/0236270 | A1 | 8/2017 | Hanna et al. |

FOREIGN PATENT DOCUMENTS

| | | |
|---|---|---|
| JP | 2005-121450 A | 5/2005 |
| JP | 3746623 B2 * | 2/2006 |
| WO | 9700438 A1 | 1/1997 |

* cited by examiner

METHOD OF OPTICAL QUALITY INSPECTION OF WORKPIECES

TECHNICAL FIELD

The present disclosure deals with a method for optically inspecting nominally identical workpieces with manufacturing tolerances. In this context, "nominally identical" workpieces are such workpieces that are manufactured to the same specification, but that, due to manufacturing tolerances, manufacturing defects, or other damage may differ from one another. The method serves to separate workpieces passing the quality inspection from those failing the quality inspection.

BACKGROUND

In serial production of mass-produced components, quality control systems are often used to assure high-quality final products. For example, in the manufacturing of small arms ammunition such as types for handguns and rifles, it is desired to implement an automated inspection system which can identify defective parts. For example, ammunition cases typically made of brass or other metals can have defects such as nicks, gouges, voids, and discoloration. Numerous other types of rotationally symmetric workpieces such as shafts and pins pose similar inspection requirements. One approach toward providing quality control is the use of human inspectors which observe parts as they move through an assembly line stream. In addition to the cost for implementing such a system, reliability of such inspection is a concern. Numerous approaches toward automating the inspection system have been implemented. Such systems typically rely upon so-called machine vision systems in which the parts are illuminated in some manner and reflected or transmitted light images are evaluated by video cameras or linear detector arrays. Although such systems have been found to operate generally satisfactorily, they are frequently unable to resolve the full range of defects found in such components, limit throughput rate, can be costly to purchase and operate, and give rise to their own significant maintenance requirements. One such inspection system is disclosed in US 2017/0236270 A1.

SUMMARY

The present disclosure aims to automate the inspection process and to enhance speed, efficiency, and consistency.

A method for inspecting nominally identical workpieces with manufacturing tolerances is proposed, the method comprising: feeding a workpiece to an inspection device; applying a simultaneous translatory and rotational movement to the workpiece via the inspection device while illuminating the workpiece; repeatedly taking camera images of the workpiece during the simultaneous translatory and rotational movement as the workpiece moves across a camera window, the camera images consisting of pixels; setting workpiece parameters based on size and shape of the workpiece; assembling a composite image from the camera images based on the workpiece parameters; determining numerical brightness scores of the workpiece from the composite image, comparing the determined numerical brightness scores with known numerical brightness scores; assigning a discrepancy score representative of a deviation of the determined numerical brightness scores of the workpiece from the known numerical brightness scores; setting a discrepancy score threshold; determining that the workpiece passes inspection upon determining that the discrepancy score is below the discrepancy score threshold; and determining that the workpiece fails the inspection upon determining that the discrepancy score is above the discrepancy score threshold.

For aligning images taken by the camera, the workpiece parameters may include local brightness measurements to determine a front the workpiece as the workpiece moved across the camera window.

The comparison of the determined numerical brightness scores with the known numerical brightness scores may be performed on bins, each of the bins being composed of a plurality of the pixels, wherein each of the pixels associated with the workpiece is included in at least one of the bins. Averaging brightness scores for bins of pixels eliminates minor irregularities that do not affect the overall compliance of the workpiece.

For continuous scanning of the entire workpiece, each of the bins preferably overlaps with at least one other one of the bins.

The determined numerical brightness scores may be determined by a weighted blur of adjacent ones of the bins. This may be accomplished by weighting factors including at least a first weighting factor and a second weighting factor for performing the following steps: selecting a center bin with a first bin brightness score multiplied by the first weighting factor; and selecting at least one adjacent bin with a second bin brightness score multiplied by the second weighting factor, wherein the second weighting factor is smaller than the first weighting factor.

For complete coverage of the workpiece surface, each of the pixels associated with the workpiece may form a center pixel of one of the bins so that the number of the pixels associated with the workpiece is identical to the number of the bins.

The discrepancy score is calculated by comparing a string of the determined numerical brightness scores to a string of known numerical brightness scores. Such a string may, for example, be a string of comma-separated values (CSV) or a similar arrangement. Each of the numbers within the string may have a plurality of digits, for example three digits.

The string of known numerical brightness scores may be subtracted from the string of the determined numerical brightness scores, wherein negative values are set to zero, and wherein the discrepancy score is calculated as:

$$DS(Y_m) = \log_e\left(\frac{\bar{x}}{\sigma/\sqrt{n}}\right)$$

with DS being the discrepancy score, Ym being the string of the determined numerical brightness scores, n being the number of numerical brightness scores in the string of the determined numerical brightness scores, and x being individual brightness scores within the string of the determined numerical brightness scores.

The string of determined numerical brightness scores may be cut off at a number of digits corresponding to the known string of brightness scores or vice versa. The difference in length is rather small as the length of the tested workpiece and of the workpieces measured for the known string of brightness scores are nominally of the same size.

The known numerical brightness scores may be determined by initially determining the numerical brightness scores for a sample batch of workpieces and by storing the determined numerical brightness scores for the sample batch of workpieces as known numerical brightness scores. The sample batch may contain master workpieces known to pass inspection. Alternatively, the sample batch may contain workpieces that are not known to pass inspection, wherein outliers among individual brightness scores are disregarded for determining the known brightness scores.

The sample batch of workpieces may be evaluated for setting additional parameters, including conditions for determining a start of each of the workpieces moving across the camera window. For example, the conditions for determining the start of each of the workpieces may be set to require a minimum number of contiguous pixels exceeding a brightness threshold.

Likewise, the sample batch of workpieces may be evaluated for setting additional parameters, including conditions for determining an end of each of the workpieces moving across the camera window. For example, the conditions for determining the end of each of the workpieces may be set to require a minimum number of contiguous pixels exceeding a brightness threshold.

The known numerical brightness scores are preferably stored as a string of numbers in the same format as the string of numbers for the tested workpieces.

Instead of one singly discrepancy score, additional discrepancy score thresholds for creating a range of different quality categories for different zones of the workpiece may be applied. Optionally, different discrepancy scores for different quality standards may be applied that allow sorting the workpieces into more than one passing class, for example "A" and "B" in addition to "Fail."

Further details and benefits of the proposed method will be describe in the context of the appended drawings. The drawings are provided solely for illustrating examples of the proposed method and are not intended to limit the scope of the present invention.

DETAILED DESCRIPTION OF THE DRAWINGS

Figure 1:
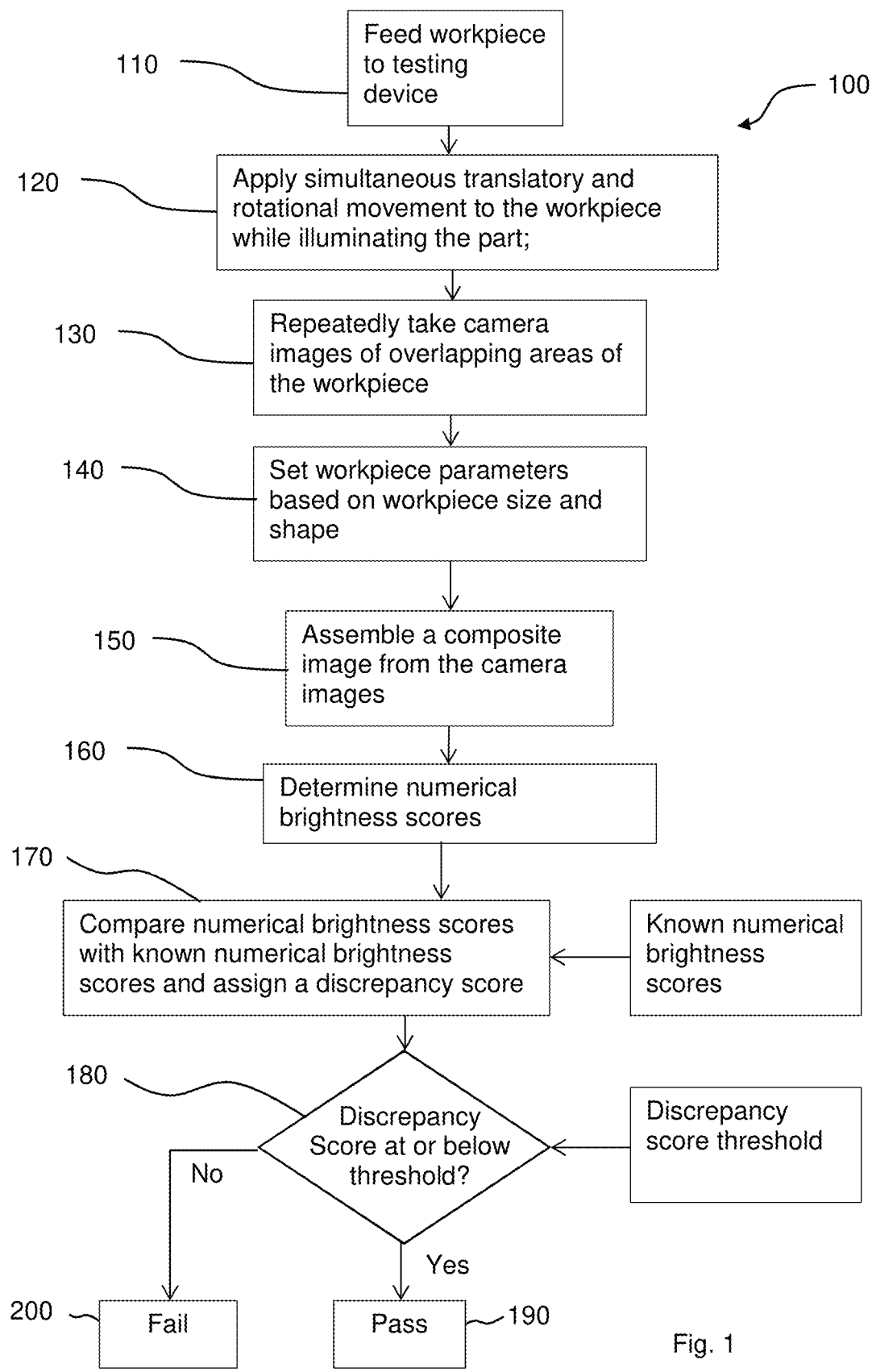
FIG. 1 shows a flow chart illustrating general basic method steps of the proposed method.

In FIG. 1, a general workflow of the presented inspection method 100 is illustrated.

For inspecting nominally identical workpieces 10 with manufacturing tolerances, the method 100 involves feeding a workpiece to an inspection device in step 110. The workpiece 10 undergoes a simultaneous translatory and rotational movement via the inspection device while illuminating the workpiece in step 120. A camera takes camera images of overlapping areas of the workpiece during the simultaneous translatory and rotational movement in step 130 as the workpiece moves across a camera window.

The camera images are composed of pixels. The operator sets numerical parameters 20 determined by the shape and size of the workpiece 10 in step 140 to determine how the overlapping camera images match up. In step 150, a composite image is assembled from the camera images 12 based on matching parameters from step 140. The composite image is then analyzed to determine numerical brightness scores for the quality assessment of the workpiece in step 160. These numerical brightness scores can be pixel brightness scores, averaged brightness scores, or blurred brightness scores, as will be explained in more detail below. The determined numerical brightness scores are then compared with known numerical brightness scores in step 170. The known numerical brightness scores are retrieved from a non-volatile computer memory and are derived from prior measurements as will be discussed below. The comparison of the determined brightness scores with the known brightness scores results in a discrepancy score DS representative of a difference between the determined numerical brightness scores and the workpiece from the known numerical brightness scores.

This discrepancy score is then compared in step 180 with a discrepancy score threshold that is set by the operator to separate workpieces passing the inspection from workpieces failing the inspection and is stored in a non-volatile computer memory. The discrepancy score threshold takes into account customer specifications for acceptable manufacturing tolerances. The discrepancy score threshold may be one uniform threshold over the entire workpiece or may differ for different zones of the workpiece.

It is then determined in step 190 that the workpiece passes inspection upon determining that the discrepancy score is below the discrepancy score threshold and in step 200 that the workpiece fails the inspection upon determining that the discrepancy score is above the discrepancy score threshold. Based on this determination, the workpieces are then automatically sorted into correspondingly labeled containers.

As mentioned above, according to the presented method, a workpiece undergoes a simultaneous rotational and translatory movement. For example, a belt and a rail may be used to simultaneously spin and move the workpiece through an inspection area represented by a camera window that represents an area of images recorded by a camera in quick succession. A belt moves the workpiece across the machine and spins the workpiece with the help of a rail extending diagonally across the belt. The rotation allows the camera to record every part of the surface in overlapping images, and the translatory movement feeds consecutive workpieces for a fast and efficient process. The principle of this arrangement is, for example, realized in the inspection system disclosed in US 2017/0236270 A1, of which the entire disclosure, providing details of the physical arrangement of the mechanism for moving the workpiece, of the camera arrangement, and of the illumination of the workpiece, is incorporated herein by reference.

Figure 4:
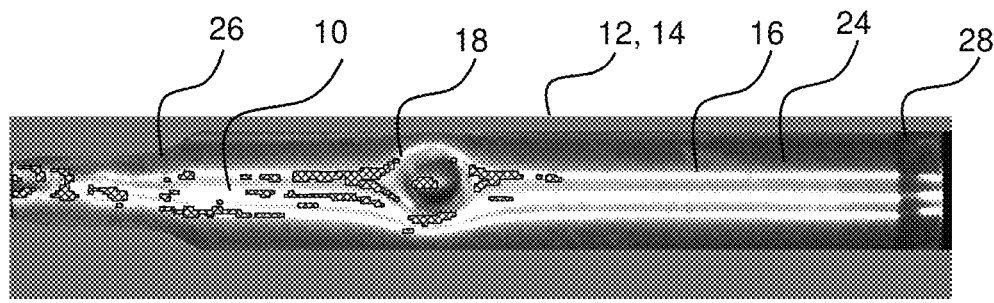
FIG. 4 shows a schematic illustration of an illuminated workpiece undergoing the proposed method of inspection.
Figure 5:
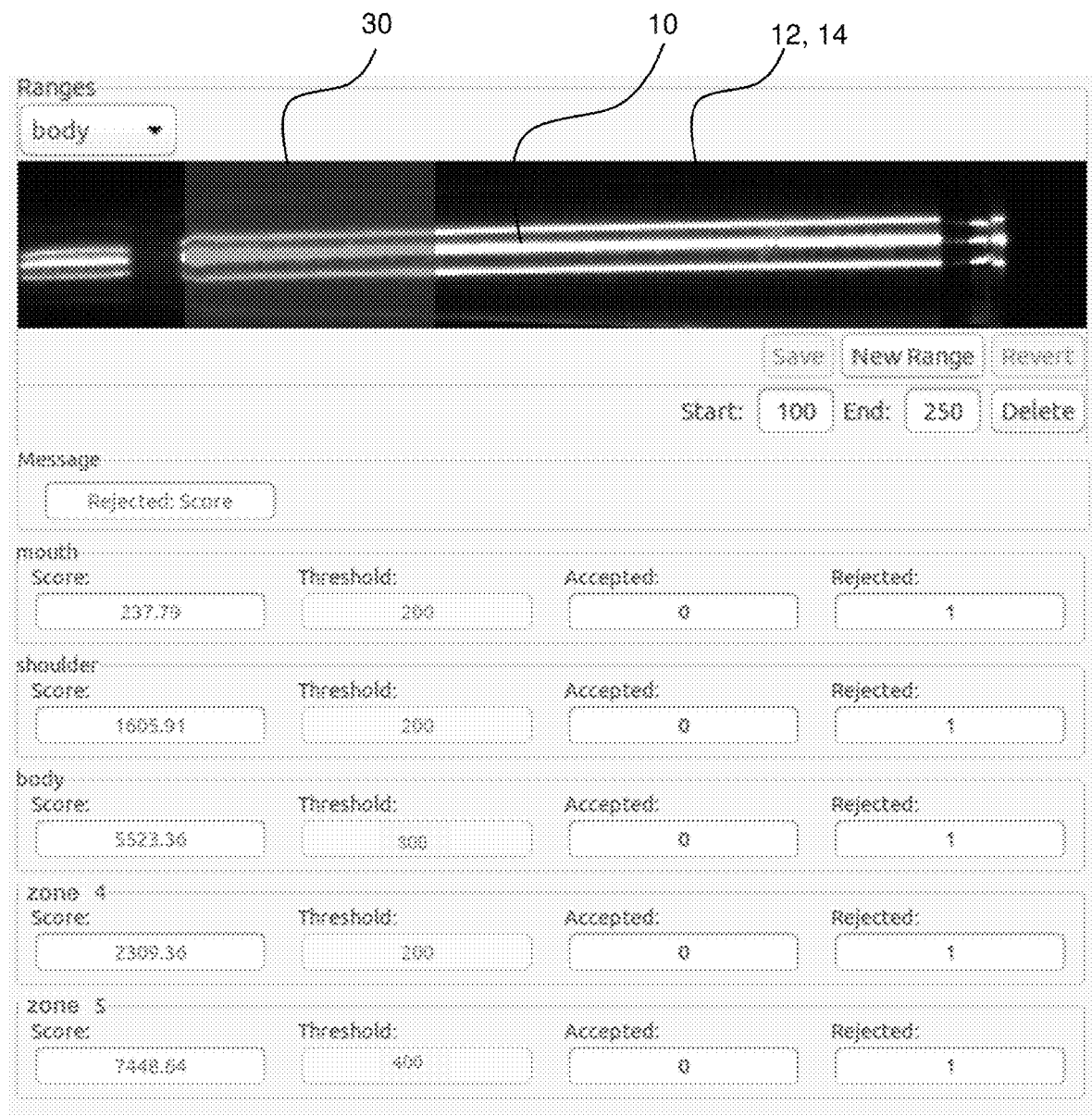
FIG. 5 shows a user interface represented as an input screen for setting discrepancy thresholds for passing inspection.

In the example discussed here, the camera takes images 12 of a camera window 14 at a rate of about 1500 images per second. Examples of camera images are shown in FIGS. 4 and 5. The system would still be operable if the camera took fewer frames per second. It is advisable that the frequency of the camera is coordinated with the speed of the belt so that each spot on the surface of the workpiece is properly recorded by the camera, preferably in two or more images. At 1500 images per second, the workpieces are moving quickly, and this process allows for up to 2500 images per workpiece depending on the length of the workpiece. Accordingly, at this speed, over 2000 workpieces per hour can be inspected.

According to the general steps of the proposed method, each of the camera images 12 is initially evaluated to track the workpiece 10 to determine where the front of the workpiece 10 is, i.e. where the workpiece enters the camera window and travels across.

A sophisticated automatic tracking method detects the front of the workpiece 10. As the workpiece travels from one end of the camera window 14 to the other, it is further determined how many pixels the front is from the back. By ascertaining the location of the front and the back within the camera image 12, the columns across all the images are lined up so the front is always in the same column. This permits an exact optical inspection of the entire surface of the workpiece.

Figure 2:
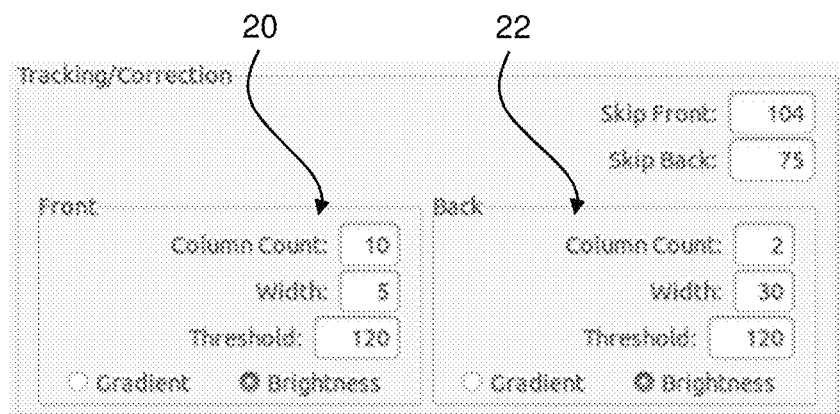
FIG. 2 shows a user interface represented as an input screen for setting parameters for determining the location of the front and the back of a workpiece.

As shown in FIG. 2, the operator sets numerical workpiece parameters 20 determined by the shape and size of the workpiece 10 in step 140. The workpiece parameters 20 referenced determine how many pixels must be in a column for it to represent the width of the front of the workpiece 10, how many columns in a row must meet the criterion to correspond to the shape at the front of the workpiece 10 and how bright the pixels have to be in order to be counted. Once all these parameters are set, the program looks at each column of pixels starting from the side of the camera window 14 that forms the downstream edge of the camera window 14. Accordingly, if the workpiece 10 moves from the right to the left as illustrated in FIGS. 4 and 5, the program starts on the pixel column at the left edge of the camera window 14. The program continues to look at pixel columns progressively further toward the right of the camera window 14 until a column meets the criteria set by the operator. In this manner, the program will find the front of the workpiece 10 for a first subset of the camera images 12. For example, if the camera window 14 has a width equal to the length of the workpiece 10, the front of the workpiece 10 is only visible in the first half of the camera images 12, until the back of the workpiece 10 enters the camera window 14.

Because the workpiece 10 is moving, eventually the front of the workpiece 10 is no longer in view. Once the workpiece 10 is fully in view as, for example, determined by light being held roughly constant across the camera window 14 for two consecutive camera images 12, the program also tracks the back of the workpiece 10. To track the back, the operator has to input similar parameters 22, and the program finds the first column from the left of the camera window 14 that meets the criteria of the parameters set for the back of the workpiece 10. It will then measure how many pixels the front of the workpiece 10 is from the back. In this manner, all of the images can be aligned to match up, even though the workpiece 10 will not be completely visible for all camera images 12.

FIG. 2 illustrates such parameters 20 for the front and parameters 22 for the back. In the case of the workpiece 10 of FIGS. 4 and 5, which is an ammunition cartridge, the front of the workpiece is narrower than the back. Also, because the back of the workpiece has a crimped cap, the continuous length of the back is shorter than the front. In the given example, the brightness parameters 20 and 22 for both the front and the back are identical as the entire workpiece surface is made of the same metal.

Figure 3:
FIG. 3 shows a user interface represented as an input screen for setting bin size and alignment criteria for matching consecutive camera images.

Once the front of the workpiece 10 has been determined, the method further involves the creation of a composite image of the workpiece as mentioned in step 150. For a proper assessment of consecutively taken camera images 12, each subsequent camera image is compared to the immediately preceding camera image taken. The comparison may be performed pixel by pixel. However, because the borders between pixels do not necessarily coincide in different camera images, a bin comparison may be a more reliable manner of alignment. An interface for setting up a bin comparison is shown in FIG. 3. To create bins, the operator sets the size of boxes constituting a bin by specifying a number of pixels in both the x-direction (length L) and the y-direction (height H) of the two-dimensional camera image 12. In the following description, the terms "box" and "bin" are used interchangeably, where "box" generally relates to the shape of the bin in the camera image 12.

The entire cameral image is covered by boxes constituting bins. Moreover, ideally each box is offset from neighboring boxes by only one pixel so that each pixel forms the center of one box but is also part of at least one surrounding box. Further, the operator sets a sensitivity of the test to determine how fine the inspection should be, i.e. how closely the numerical brightness scores of the compared bins need to match up for the assumption of alignment.

Once the camera images 12 are taken, each bin of the size L by H (for example, L=3 and H=3 as specified by the operator) is compared it to a corresponding bin from the preceding camera image. Let $X_1 Y_1$ be the coordinates on the first picture for the test and $X_0 Y_0$ be those same coordinates on the previous picture. A box that is L×H (L being Length and H being Height as specified by the operator), centered around the $X_1 Y_1$ coordinates, is compared to a box that is L×H centered around $X_0 Y_0$. The boxes within a camera image 12 may be offset from each other by one or more pixels in the X- and Y-direction as provided by the operator through an interface illustrated, for example, in FIG. 3.

Each of the boxes is reduced into a numerical brightness score based on the average brightness of pixels in the box. To calculate the numerical brightness score of each box, the brightness of each pixel within the box is scored with a brightness score in the range from 0 to 255, with 0 being completely black and 255 being a completely white pixel. The individual brightness scores of the pixels within the box are then averaged to the numerical brightness score of the box. The averaged numerical brightness score of the box is then compared to the same box in the previous picture to see the difference. If the percentage change from the previous picture is greater than a pre-set number (specified by the operator), the bin is marked in a bright contrast color, for example red or orange (shown as a cross-hatched pattern in FIG. 4) and counts as "1". This is repeated with overlapping bins until all pixels are counted. All of the previously marked bins that appear in the same area are added, and all of the collected data are reduced to a string of numbers that is as many numbers long as the workpiece 10 had pixels; and represents a quantitative quality of the workpiece 10. This quantitative quality, however, does not dictate whether the workpiece passes or fails inspection.

In the example illustrated in FIG. 4, the illumination of step 120 directs linear arrays of light onto the workpiece 10 to present lines of light at various angular positions with respect to the longitudinal axis of the workpiece 10. The camera images 12 referenced in step 130 of FIG. 1, are represented by the camera window 14 in FIG. 4 and capture the illuminated stripes 16 on the workpiece 10. As illustrated, these stripes 16 are interrupted or deformed in the presence of a defect 18. Accordingly, a nick or dent is clearly observable as a deviation 18 of the stripes 16 in comparison to prior or subsequent images. In cylindrical zones 20, the stripes 16 are parallel, and in zones 22 of changing workpiece diameter, the stripes 16 converge or diverge according to the shape. As discussed in connection with FIG. 2, the system accounts for the translatory movement of the workpiece 10 by a proper translatory offset so that the pixels representing the workpiece 10 are properly aligned among subsequent images 12 with respect to the outline of the workpiece 10. On a perfect surface, the stripes 16 would be identical in every camera image 12 over a complete rotation of 360°. This applies to cylindrical surfaces 24, conical surfaces 26, and other profile shapes 28 as long as the workpiece 10 has a circular cross-section. If the surface is disturbed, however, by a scratch or a dent, corresponding bins of consecutive camera images 12 differ from one another because the disturbance changes its position relative to the outline of the workpiece 10 due to the rotation of the workpiece 10.

It is not crucial that the illumination forms stripes 16. Generally, the method can also be performed with a uniform illumination of the entire camera window 14 of the camera images. It may, however, be helpful to observe the additional change in the shape of the stripes 16 in addition to mere brightness comparisons.

For the further quality analysis beginning in step 170, either the bin brightness scores may be used, or a localized blur may be added. The blur is accomplished by adding bin brightness scores modified by weighting factors, with which the numerical brightness scores are multiplied. Each bin forms the center of a respective blurred area with a first weighting factor for the numerical brightness score of the center bin and smaller weighting factors for surrounding bins. For example, the center bin may have a weighting factor of 0.5, the closest surrounding bins may receive a weighting factor of 0.2, and bins directly outward from the closest surrounding bins may receive a weighting factor of 0.05. The sum of weighted brightness scores is then normalized by dividing the result by the sum of all individual weighting factors flowing into the sum of weighted brightness scores. The result of this calculation is the blurred numerical brightness score of the center bin. This blur helps bigger defects score higher and filters out some smaller defects that the operator most likely would not want to categorize as failing inspection.

Once the blurred numerical brightness scores have been determined for all bins, they form columns and rows in a table representing the flattened surface of the workpiece reproduced in the composite image, where the rows extend parallel to the rotational axis of the workpiece and the columns extend transverse to the rotational axis. All numerical brightness scores of a column are added up in each column so that the result is a string of numbers that is (Y/L)*2−1 (or n) numbers long.

In order to have known brightness scores as nominal target values, a batch of masterpieces has been subjected to the above-described optical analysis, and the numerical brightness scores of all masterpieces have been matched up and averaged to create a master string of known brightness scores. Instead of a master batch, a sample batch of unknown compliance may be analyzed. In that case, outliers of individual brightness scores may be removed before calculating the averaged brightness scores of the master string of known brightness scores.

A comparison of the string of determined brightness scores with the master string of known brightness scores, the lengths of the two strings might differ from one another by a very small number of brightness scores. This small difference does not affect the overall quality assessment because it affects only one or two columns of pixels. For a successful comparison, the longer one of the two strings of brightness scores can be truncated to the length of the shorter one without negative consequences.

Then the master string of known brightness scores is compared to the string of determined brightness scores in step 170 to calculate a discrepancy score. Calling the master string $Y_m$ with n numbers and the numerical string of brightness scores of the test workpiece $Y_t$. A formula to compare the workpiece 10 against the master $Y_m$ may involve subtracting $Y_m$ from $Y_t$ and setting all negative numbers to zero. This does not affect the qualitative assessment because every deformation causes areas with greater illumination along with shadows. Thus, all ignored negative values are associated with positive values that are taken into account. The result is a string of differences, some of which have been set to zero. Then the mean of all numbers x in the resulting string of differences is divided by the result of the standard deviation a divided by the square root of n, with n being the length of the numerical string of differences. Finally a logarithmic function is applied to the result to help separate good and bad workpieces. The result of this calculation is the discrepancy score DS:

$$DS(Y_t) = \log_e\left(\frac{\overline{x}}{\sigma/\sqrt{n}}\right)$$

If the discrepancy score $DS(Y_t)$ is higher than a predetermined number (set by the operator of by a third party) the workpiece 10 fails.

As shown in FIG. 5, for taking into account different requirements for different section of the workpiece 10, it is possible to set up zones 30. This allows the operator to analyze one subset of brightness scores after another.

In the example shown in FIG. 5, the zone 30 currently inspected is set to run the above equation for n=100 through n=250, where the numbers "100" and "250" designate positions of the brightness scores in the numerical string of determined brightness scores or the corresponding positions within the string of differences.

In the example of FIG. 5, five zones have been set up. Purely for illustrative purposes, the thresholds for passing inspection in each of these zones have been individually set. Some of the thresholds are identical, while others are different. In situations, where the inspection is performed on different zones, the workpiece fails inspection if at least one of the zones has a discrepancy score above the individually set discrepancy score of the respective zone. Only if all zonal discrepancy scores are at or below the individually set discrepancy score of the respective zone, the workpiece passes the inspection in step 180.

While the above description pertains to the preferred embodiments of the present invention, the invention is susceptible to modification, variation and change without departing from the proper scope and fair meaning of the accompanying claims.

What is claimed is:
1. A method for optically inspecting nominally identical workpieces of a circular cross-section with manufacturing tolerances, the method comprising:
feeding a workpiece to an inspection device;
applying a simultaneous translatory and rotational movement to the workpiece via the inspection device while illuminating the workpiece;
repeatedly taking camera images of overlapping areas of the workpiece during the simultaneous translatory and rotational movement as the workpiece moves across a camera window, the camera images consisting of pixels;

setting workpiece parameters based on size and shape of the workpiece;

assembling a composite image from the camera images based on the workpiece parameters;

determining numerical brightness scores of the workpiece from the composite image;

comparing the determined numerical brightness scores with known numerical brightness scores;

assigning a discrepancy score representative of a deviation of the determined numerical brightness scores of the workpiece from the known numerical brightness scores;

setting a discrepancy score threshold;

determining that the workpiece passes inspection upon determining that the discrepancy score is below the discrepancy score threshold; and determining that the workpiece fails the inspection upon determining that the discrepancy score is above the discrepancy score threshold.

2. The method according to claim 1, wherein the workpiece parameters include local brightness measurements to determine a front the workpiece as the workpiece is moved across the camera window.

3. The method according to claim 1, wherein the comparison of the determined numerical brightness scores with the known numerical brightness scores is performed on bins, each of the bins being composed of a plurality of the pixels, wherein each of the pixels associated with the workpiece is included in at least one of the bins.

4. The method according to claim 3, wherein each of the bins overlaps with at least one other one of the bins.

5. The method according to claim 3, wherein the determined numerical brightness scores are determined by a weighted blur of adjacent ones of the bins.

6. The method according to claim 5, where creating the weighted blur comprises weighting factors including at least a first weighting factor and a second weighting factor for performing the following the steps:

selecting a center bin with a first bin brightness score multiplied by the first weighting factor; and selecting at least one adjacent bin with a second bin brightness score multiplied by the second weighting factor, wherein the second weighting factor is smaller than the first weighting factor.

7. The method according to claim 3, wherein each of the pixels associated with the workpiece forms a center pixel of one of the bins so that the number of the pixels associated with the workpiece is identical to the number of the bins.

8. The method according to claim 1, wherein the discrepancy score is calculated by comparing a string of the determined numerical brightness scores to a string of known numerical brightness scores.

9. The method according to claim 8, wherein the string of known numerical brightness scores is subtracted from the string of the determined numerical brightness scores to form a string of differences, wherein negative values are set to zero, and wherein the discrepancy score is calculated as $$DS(Y_t) = \log_e\left(\frac{\overline{x}}{\sigma/\sqrt{n}}\right)$$

with DS being the discrepancy score, $Y_t$ being the string of the determined numerical brightness scores, n being the number of numerical brightness scores in the string of the determined numerical brightness scores, and x being individual numbers within the string of differences.

10. The method according to claim 8, wherein, upon determining that the string of determined numerical brightness scores has a different length than the string of known numerical brightness scores, the longer one of the string of determined numerical brightness scores and the string of known numerical brightness scores is cut off at a number of digits corresponding to the shorter one of the string of determined numerical brightness scores and the string of known numerical brightness scores.

11. The method according to claim 1, wherein the known numerical brightness scores are determined by initially determining the numerical brightness scores for a sample batch of workpieces and by storing the determined numerical brightness scores for the sample batch of workpieces as known numerical brightness scores.

12. The method according to claim 11, wherein the sample batch contains master workpieces known to pass inspection.

13. The method according to claim 11, wherein the sample batch contains workpieces that are not known to pass inspection, wherein outliers among individual brightness scores are disregarded for determining the known brightness scores.

14. The method according to claim 11, wherein the camera images of the sample batch of workpieces is evaluated for setting additional parameters, including conditions for determining a start of each of the workpieces moving across the camera window.

15. The method according to claim 14, wherein the conditions for determining the end of each of the workpieces require a minimum number of contiguous pixels exceeding a brightness threshold.

16. The method according to claim 14, wherein the conditions for determining the start of each of the workpieces require a minimum number of contiguous pixels exceeding a brightness threshold.

17. The method according to claim 11, wherein the sample batch of workpieces is evaluated for setting additional parameters, including conditions for determining an end of each of the workpieces moving across the camera window.

18. The method according to claim 11, wherein the known numerical brightness scores are stored as a string of numbers.

19. The method according to claim 1, further comprising the step of setting additional discrepancy score thresholds for creating a range of different quality categories for different zones of the workpiece.

* * * * *